(12) United States Patent
Kivinen et al.

(10) Patent No.: US 8,914,872 B2
(45) Date of Patent: *Dec. 16, 2014

(54) REVEALING OCCURRENCE OF NETWORK ADDRESS TRANSLATIONS

(71) Applicant: SSH Communications Security Oyj, Helsinki (FI)

(72) Inventors: Tero Kivinen, Espoo (FI); Tatu Ylonen, Espoo (FI)

(73) Assignee: SSH Communications Security Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,492

(22) Filed: Aug. 26, 2013

(65) Prior Publication Data

US 2013/0339524 A1 Dec. 19, 2013

Related U.S. Application Data

(63) Continuation of application No. 12/862,305, filed on Aug. 24, 2010, now Pat. No. 8,544,079, which is a continuation of application No. 11/128,933, filed on May 12, 2005, now Pat. No. 8,127,348, which is a continuation of application No. 09/333,829, filed on Jun. 15, 1999, now Pat. No. 6,957,346.

(51) Int. Cl.
*H04L 29/06* (2006.01)
*H04L 12/46* (2006.01)
*H04L 29/12* (2006.01)

(52) U.S. Cl.
CPC .......... *H04L 63/04* (2013.01); *H04L 12/4633* (2013.01); *H04L 29/12009* (2013.01); *H04L 29/12367* (2013.01); *H04L 29/12471* (2013.01); *H04L 29/125* (2013.01); *H04L 29/12528* (2013.01); *H04L 29/12537* (2013.01); *H04L 61/2514* (2013.01); *H04L 61/2553* (2013.01); *H04L 61/2564* (2013.01); *H04L 61/2575* (2013.01); *H04L 61/2578* (2013.01); *H04L 63/029* (2013.01); *H04L 63/164* (2013.01); *H04L 69/161* (2013.01); *H04L 69/165* (2013.01); *H04L 61/25* (2013.01); *H04L 61/2007* (2013.01); *H04L 63/0428* (2013.01); *H04L 69/16* (2013.01)
USPC ........................................... 726/14

(58) Field of Classification Search
CPC ............. H04L 63/04; H04L 29/12367; H04L 29/12471; H04L 29/125; H04L 29/12528; H04L 29/12537; H04L 63/029; H04L 63/164; H04L 63/0428; H04L 29/12009
USPC ........................................... 726/14
See application file for complete search history.

(56) References Cited

U.S. PATENT DOCUMENTS 5,377,182 A * 12/1994 Monacos ...................... 370/219
5,490,134 A * 2/1996 Fernandes et al. ............ 370/466
(Continued)

FOREIGN PATENT DOCUMENTS

WO    WO 98/32065    7/1998
WO    WO 99/35799    7/1999

OTHER PUBLICATIONS

BorellaLo99; M. Borella, J. Lo: Realm Specific IP: Protocol Specification, draft-ietf-nat-rsip-protocol-00.txt, Work in Progress, Internet Engineering Task Force, 1999.

(Continued)

*Primary Examiner* — David García Cervetti
(74) *Attorney, Agent, or Firm* — Pillsbury Winthrop Shaw Pittman, LLP

(57) ABSTRACT

A method, apparatus, and computer-readable media are presented that provide a configuration for revealing occurrence of network address translation by receiving a packet that includes an encoding of a source port number and then determining whether a network address translation occurred on the packet by comparing the source port number against a predetermined port number.

15 Claims, 4 Drawing Sheets

(56) References Cited

U.S. PATENT DOCUMENTS

| | | | | |
|---|---|---|---|---|
| 5,506,847 A * | 4/1996 | Shobatake | | 370/338 |
| 5,757,795 A * | 5/1998 | Schnell | | 370/392 |
| 5,757,924 A | 5/1998 | Friedman et al. | | |
| 5,793,763 A | 8/1998 | Mayes et al. | | |
| 5,914,953 A * | 6/1999 | Krause et al. | | 370/392 |
| 5,933,429 A * | 8/1999 | Bubenik et al. | | 370/392 |
| 5,964,835 A * | 10/1999 | Fowler et al. | | 709/216 |
| 5,974,453 A * | 10/1999 | Andersen et al. | | 709/220 |
| 5,983,360 A * | 11/1999 | Ugajin | | 714/11 |
| 6,006,254 A | 12/1999 | Waters et al. | | |
| 6,023,563 A * | 2/2000 | Shani | | 709/249 |
| 6,028,862 A * | 2/2000 | Russell et al. | | 370/397 |
| 6,055,236 A * | 4/2000 | Nessett et al. | | 370/389 |
| 6,058,431 A * | 5/2000 | Srisuresh et al. | | 709/245 |
| 6,122,669 A * | 9/2000 | Crayford | | 709/232 |
| 6,128,298 A * | 10/2000 | Wootton et al. | | 370/392 |
| 6,137,781 A * | 10/2000 | Goto et al. | | 370/255 |
| 6,154,839 A * | 11/2000 | Arrow et al. | | 713/154 |
| 6,157,967 A * | 12/2000 | Horst et al. | | 710/19 |
| 6,173,312 B1 * | 1/2001 | Atarashi et al. | | 709/203 |
| 6,178,160 B1 | 1/2001 | Bolton et al. | | |
| 6,178,505 B1 | 1/2001 | Schneider et al. | | |
| 6,201,789 B1 * | 3/2001 | Witkowski et al. | | 370/230 |
| 6,230,191 B1 * | 5/2001 | Walker | | 709/213 |
| 6,233,623 B1 | 5/2001 | Jeffords et al. | | |
| 6,273,622 B1 | 8/2001 | Ben-David | | |
| 6,278,711 B1 * | 8/2001 | Ganmukhi et al. | | 370/395.1 |
| 6,282,589 B1 * | 8/2001 | Porterfield et al. | | 710/52 |
| 6,324,178 B1 | 11/2001 | Lo et al. | | |
| 6,324,582 B1 | 11/2001 | Sridhar et al. | | |
| 6,324,590 B1 * | 11/2001 | Jeffords et al. | | 719/316 |
| 6,327,267 B1 | 12/2001 | Valentine et al. | | |
| 6,330,562 B1 | 12/2001 | Boden et al. | | |
| 6,331,984 B1 * | 12/2001 | Luciani | | 370/401 |
| 6,339,595 B1 | 1/2002 | Rekhter et al. | | |
| 6,356,551 B1 * | 3/2002 | Egbert | | 370/389 |
| 6,360,265 B1 * | 3/2002 | Falck et al. | | 709/227 |
| 6,377,577 B1 * | 4/2002 | Bechtolsheim et al. | | 370/392 |
| 6,381,646 B2 | 4/2002 | Zhang et al. | | |
| 6,393,488 B1 * | 5/2002 | Araujo | | 709/245 |
| 6,408,336 B1 | 6/2002 | Schneider et al. | | |
| 6,411,986 B1 * | 6/2002 | Susai et al. | | 709/203 |
| 6,418,476 B1 * | 7/2002 | Luciani | | 709/238 |
| 6,457,061 B1 * | 9/2002 | Bal et al. | | 709/245 |
| 6,463,061 B1 | 10/2002 | Rekhter et al. | | |
| 6,480,891 B1 * | 11/2002 | Chernyak et al. | | 709/223 |
| 6,484,236 B2 * | 11/2002 | Fujimoto et al. | | 711/114 |
| 6,487,218 B1 | 11/2002 | Ludwig et al. | | |
| 6,501,767 B1 | 12/2002 | Inoue et al. | | |
| 6,507,908 B1 | 1/2003 | Caronni | | |
| 6,512,774 B1 * | 1/2003 | Vepa et al. | | 370/401 |
| 6,515,974 B1 * | 2/2003 | Inoue et al. | | 370/331 |
| 6,515,997 B1 | 2/2003 | Feltner et al. | | |
| 6,519,248 B1 * | 2/2003 | Valko | | 370/352 |
| 6,526,056 B1 | 2/2003 | Rekhter et al. | | |
| 6,563,824 B1 * | 5/2003 | Bhatia et al. | | 370/392 |
| 6,590,861 B1 * | 7/2003 | Vepa et al. | | 370/216 |
| 6,614,781 B1 * | 9/2003 | Elliott et al. | | 370/352 |
| 6,615,357 B1 * | 9/2003 | Boden et al. | | 726/15 |
| 6,617,879 B1 * | 9/2003 | Chung | | 326/82 |
| 6,633,540 B1 * | 10/2003 | Raisanen et al. | | 370/230.1 |
| 6,665,733 B1 * | 12/2003 | Witkowski et al. | | 709/249 |
| 6,694,429 B1 * | 2/2004 | Kalmanek et al. | | 713/153 |
| 6,697,354 B1 * | 2/2004 | Borella et al. | | 370/352 |
| 6,701,437 B1 | 3/2004 | Hoke et al. | | |
| 6,731,625 B1 * | 5/2004 | Eastep et al. | | 370/352 |
| 6,738,384 B1 * | 5/2004 | Chung | | 370/412 |
| 6,744,728 B1 * | 6/2004 | Chung | | 370/229 |
| 6,751,221 B1 | 6/2004 | Saito et al. | | |
| 6,751,225 B1 * | 6/2004 | Chung | | 370/401 |
| 6,757,290 B1 * | 6/2004 | Kalmanek et al. | | 370/401 |
| 6,785,223 B1 * | 8/2004 | Korpi et al. | | 370/218 |
| 6,795,917 B1 | 9/2004 | Ylonen | | |
| 6,816,490 B1 * | 11/2004 | Chung | | 370/392 |
| 6,870,845 B1 * | 3/2005 | Bellovin et al. | | 370/392 |
| 6,909,708 B1 * | 6/2005 | Krishnaswamy et al. | | 370/352 |
| 6,925,076 B1 * | 8/2005 | Dalgic et al. | | 370/356 |
| 6,957,346 B1 * | 10/2005 | Kivinen et al. | | 713/153 |
| 7,032,242 B1 * | 4/2006 | Grabelsky et al. | | 726/11 |
| RE39,360 E | 10/2006 | Aziz et al. | | |
| 7,145,898 B1 * | 12/2006 | Elliott | | 370/352 |
| 7,151,772 B1 * | 12/2006 | Kalmanek et al. | | 370/390 |
| 7,161,937 B1 | 1/2007 | Dunning et al. | | |
| 7,221,666 B2 * | 5/2007 | Inoue et al. | | 370/338 |
| 7,274,662 B1 * | 9/2007 | Kalmanek et al. | | 370/230 |
| 7,305,081 B1 * | 12/2007 | Kalmanek et al. | | 379/219 |
| 7,346,770 B2 | 3/2008 | Swander et al. | | |
| 7,492,886 B1 * | 2/2009 | Kalmanek et al. | | 379/220.01 |
| 7,742,467 B1 * | 6/2010 | Kalmanek et al. | | 370/356 |
| 7,778,240 B1 * | 8/2010 | Kalmanek et al. | | 370/352 |
| 2002/0019933 A1 | 2/2002 | Friedman et al. | | |
| 2002/0034179 A1 | 3/2002 | Ollikainen et al. | | |
| 2002/0042875 A1 * | 4/2002 | Shukla | | 713/151 |
| 2002/0059428 A1 | 5/2002 | Susai et al. | | |
| 2002/0094084 A1 | 7/2002 | Wasilewski et al. | | |
| 2003/0009561 A1 * | 1/2003 | Sollee | | 709/227 |
| 2004/0088537 A1 | 5/2004 | Swander et al. | | |
| 2006/0292292 A1 | 12/2006 | Brightman et al. | | |
| 2007/0192508 A1 * | 8/2007 | Sollee | | 709/245 |
| 2008/0028436 A1 | 1/2008 | Hannel et al. | | |
| 2010/0138560 A1 * | 6/2010 | Kivinen et al. | | 709/246 |
| 2010/0318682 A1 | 12/2010 | Kivinen et al. | | |
| 2011/0231443 A1 | 9/2011 | Hannel et al. | | |

OTHER PUBLICATIONS

HoldregeSrisuresh99; M. Holdrege, P. Srisuresh: Protocol Complications with the IP Network Address Translator (NAT), draft-ietf-nat-protocol-complications-00.txt, Work in Progress, Internet Engineering Task Force, 1999.

LoBorella99; J. Lo, M. Borella: Real Specific IP: A Framework, draft-ietf-nat-rsip-framework-00.txt, Work in Progress, Internet Engineering Task Force, 1999.

Rekhter99; Y. Rekhter: Implications of NATs on the TCP/IP architecture, draft-ietf-nat-arch-implications-00.txt, Internet Engineering Task Force, 1999.

RFC768; J. Postel: User Datagram Protocol, RFC 768, Internet Engineering Task Force, 1980.

RFC791 J. Postel: Internet Protocol, RFC 791, Internet Engineering Task Force, 1981.

RFC793; J. Postel: Transmission Control Protocol, RFC 793, Internet Engineering Task Force, 1981.

RFC959; J. Postel, J. Reynolds: File Transfer Protocol, RFC 959, Internet Engineering Task Force, 1985.

RFC1071; R. Braden, D. Borman, C. Partridge: Computing the Internet checksum, RFC 1071, Internet Engineering Task Force, 1988.

RFC1226; B. Kantor: Internet protocol encapsulation of AX.25 frames, RFC 1226, Internet Engineering Task Force, 1991.

RFC1234; D. Provan: Tunneling IPX traffic through IP networks, RFC 1234, Internet Engineering Task Force, 1991.

RFC1241; R. Woodburn, D. Mills: Scheme for an internet encapsulation protocol: Version 101, RFC 1241, Internet Engineering Task Force, 1991.

RFC1321; R. Rivest: The MD5 message-digest algorithm, RFC 1321, Internet Engineering Task Force, 1992.

RFC1326; P. Tsuchiya: Mutual Encapsulation Considered Dangerous, RFC 1326, Internet Engineering Task Force, 1992.

RFC1631; K. Egevang, P. Francis: The IP Network Address Translator (NAT), RFC 1631, Internet Engineering Task Force, 1994.

RFC1701; S. Hanks, T. Li, D Farinacci, P. Traina: Generic Routing Encapsulation, RFC 1701, Internet Engineering Task Force, 1994.

RFC1702; S. Hanks, T. U, D. Farinacci, P. Traina: Generic Routing Encapsulation over IPv4 networks, RFC 1702, Internet Engineering Task Force, 1994.

RFC 1853; W. Simpson: IP in IP Tunneling, RFC 1853, Internet Engineering Task Force, 1995.

RFC2003; C. Perkins: IP Encapsulation within IP, RFC 2003, Internet Engineering Task Force, 1996.

(56) References Cited

OTHER PUBLICATIONS

RFC2004; C. Perkins: Minimal Encapsulation within IP, RFC 2004, Internet Engineering Task Force, 1996.
RFC2107; K. Hamzeh: Ascend Tunnel Management Protocol, RFC 2107, Internet Engineering Task Force, 1997.
RFC2344; G. Montenegro: Reverse Tunneling for Mobile IP, FC 2344, Internet Engineering Task Force, 1998.
RFC2391; P. Srisuresh, D. Gan: Load Sharing using IP Network Address Translation (LSNAT), RFC 2391, Internet Engineering Task Force, 1998.
RFC2401; S. Kent, R. Atkinson: Security Architecture for the Internet Protocol, RFC 2401, Internet Engineering Task Force, 1998.
RFC2402; S. Kent, R. Atkinson: IP Authentication Header, RFC 2402, Internet Engineering Task Force, 1998.
RFC2406; S. Kent, R. Atkinson: IP Encapsulating Security Payload, RFC 2406, Internet Engineering Task Force, 1998.
RFC2407; D. Piper: The Internet IP Security Domain of Interpretation for ISAKMP. RFC 2407, Internet Engineering Task Force, 1998.
RFC2408; D. Maughan, M. Schertler, M. Schneider, J. Turner: Internet Security Association and Key Management Protocol (ISAKMP), RFC 2408, Internet Engineering Task Force, 1998.
RFC2409; D. Hakins, D. Carrel: The Internet Key Exchange (IKE), RFC 2409, Internet Engineering Task Force, 1998.
RFC2473;A Conta, S. Deering: Generic Packet Tunneling in IPv6 Specification, RFC 2473, Internet Engineering Task Force, 1998.
RFC2529; B Carpenter, C. Jung: Transmission of IPv6 over IPv4 Domains without Explicit Tunnels, RFC 2529, Internet Engineering Task Force, 1999.
Srisuresh98Terminology; P. Srisuresh: IP Network Address Translator (NAT) Terminology and Considerations, draft-ietf-nat-terminology-01.txt, Work in Progress, Internet Engineering Task Force, 1998.
Srisuresh98Security; P. Srisuresh: Security Model for Network Address Translator (NAT) Domains, draft-ietf-nat-security-01.txt, Work in Progress, Internet Engineering Task Force, 1998.
Srisuresh98Security; P. Srisuresh: Security Model for Network Address Translator (NAT) Domains, draft-ietf-nat-security-01.txt, Work in Progress, Internet Engineering Task Force, 1999.
SrisureshEgevang98; P. Srisuresh, K. Egevang: Traditional IP Network Address Translator (Traditional NAT), draft-ietf-nat-traditional-01.txt, Work in Progress, Internet Engineering Task Force, 1998.
TYS99; W. Teo, S. Yeow, R. Singh: IP Relocation through twice Network Address Translators (RAT), draft-ietf-nat-mat-00.txt, Work in Progress, Internet Engineering Task Force, 1999.
*Data Communications*, McGraw Hill, New York, U.S. Journal Article, vol. 26. Nr. 16, Nov. 1997, pp. 55-59. Rodney Thayer: "Bulletproof IP with authentication and encryption, IPSec adds a layer of armor to IP".
*IEEE, Computer*. vol. 31, Issue 9. Sep. 1998, pp. 43-47. Rolph Opplinger: "Security at the Internet Layer". ISSN: 0018-9162.
*IETF, Internet Draft*, Jun. 2, 1998. R.G. Moskowitz: "Network Address Translation Issues with IPSec", Retrieved from Internet: <URL:http://wwvv.alternic.org/drafts/draftsm-n/draftmoskowitz-net66-vpn-00.txt.
*IETF, Internet Draft*, Aug. 22, 1997, R.G. Moskowitz: "Network Address Translation Issues with IPSec". Retrieved from Internet: <URL:http://www.alternic.org/drafts/draftsm-n/draft moskowitz-ipsec-vpn-nat-00.txt.
*IETF, Internet Draft*, Apr. 1998, G. Tsirtis: "AATN Components & Mechanisms", Retrieved from Internet: <URL: http ://www.__alternic.__org/drafts/drafts-t-u/draft-tsirtsis-aatn-mech-00.txt.
IETF, Internet Draft, Feb. 1999, W.T. Teo et al: "IP Relocation through twice Network Address Translators (RAT)", Retrieved from Internet: <URL: http://tools.ietf.org/id/draft-ietf-nat-rnat-00.txt.
V. Paxson, et al. "Known TCP Implementation Problems"; Network Working Group, Informational, Mar. 1999, pp. 1-61.
D. Newman Data Communications, "Benchmarking Terminology for Firewall Performance; draft-ietf-bmwg-secperf-07.txt", May 1999.
Bova & Krivoruchka "Reliable UDP Protocol", Internet Draft, Cisco Systems, Feb. 25, 1999; pp. 1-16.
D. Presotto, et al. "The IL Protocol", 1995, Lucent Technologies, http://doc.cat-v.org/plan__9/2nd__edition/papers/il/ printed from website Apr. 4, 2011; pp. 1-10.
R. Braden, et al. "Resource ReSerVation Protocol (RSVP)"; Version 1 Functional Specification, Network Working Group; Standard Track, Sep. 1997; pp. 1-112.
U.S. Office Action dated Sep. 9, 2014 for U.S. Appl. No. 14/012,180.
U.S. Notice of Allowance dated Oct. 7, 2014 for U.S. Appl. No. 14/012,074.
U.S. Notice of Allowance dated Oct. 1, 2014 for U.S. Appl. No. 14/012,130.

* cited by examiner

REVEALING OCCURRENCE OF NETWORK ADDRESS TRANSLATIONS

CROSS REFERENCE TO RELATED APPLICATIONS

This application is a continuation of U.S. application Ser. No. 12/862,305, filed Aug. 24, 2010, now U.S. Pat. No. 8,544,079, which is a continuation of U.S. application Ser. No. 11/128,933, filed May 12, 2005, now U.S. Pat. No. 8,127,348, which is a continuation of U.S. Application Ser. No. 09/333,829, filed Jun. 15, 1999, now U.S. Pat. No. 6,957,346. The entire contents of all applications are incorporated herein by reference in their entireties.

TECHNOLOGICAL FIELD

The invention relates in general to the field of communications between computers in packet-switched data transmission networks. More particularly the invention relates to communications in systems where Network Address Translations are possible.

BACKGROUND OF THE INVENTION

The Internet Engineering Task Force (IETF) has standardized the IPSEC (Internet Protocol Security) protocol suite; the standards are well known from the Request For Comments or RFC documents number RFC2401, RFC2402, RFC2406, RFC2407, RFC2408 and RFC2409 mentioned in the appended list of references, all of which are hereby incorporated by reference. The IPSEC protocols provide security for the IP or Internet Protocol, which itself has been specified in the RFC document number RFC791. IPSEC performs authentication and encryption on packet level by generating a new IP header, adding an Authentication Header (AH) or Encapsulating Security Payload (ESP) header in front of the packet. The original packet is cryptographically authenticated and optionally encrypted. The method used to authenticate and possibly encrypt a packet is identified by a security parameter index (SPI) value stored in the AH and ESP headers. The RFC document number RFC2401 specifies a transport mode and a tunnelling mode for packets; the present invention is applicable regardless of which of these modes is used.

In recent years, more and more vendors and Internet service providers have started performing network address translation (NAT). References to NAT are found at least in the RFC document number RFC1631 as well as the documents which are identified in the appended list of references as Srisuresh98Terminology, SrisureshEgevang98, Srisuresh98Security, HoldregeSrisuresh99, TYS99, Rekhter99, LoBorella99 and BorellaLo99. There are two main forms of address translation, illustrated schematically in FIGS. 1a and 1b: host NAT 101 and port NAT 151. Host NAT 101 only translates the IP addresses in an incoming packet 102 so that an outgoing packet 103 has a different IP address. Port NAT 151 also touches the TCP and UDP port numbers (Traffic Control Protocol; User Datagram Protocol) in an incoming packet 152, multiplexing several IP addresses to a single IP address in an outgoing packet 153 and correspondingly demultiplexing a single IP address into several IP addresses for packets travelling in the opposite direction (not shown). Port NATs are especially common in the home and small office environment. The physical separation of input and output connections for the NAT devices is only shown in FIGS. 1a and 1b for graphical clarity; in practice there are many possible ways for physically connecting a NAT.

Address translation is most frequently performed at the edge of a local network (i.e., translation between multiple local private addresses on one hand and fewer globally routable public addresses on the other). Most often, port NAT is used and there is only one globally routable address. A local network 154 has been schematically illustrated in FIG. 1b. Such arrangements are becoming extremely commonplace in the home and small office markets. Some Internet service providers have also started giving private addresses to their customers, and perform address translation in their core networks for such addresses. In general, network address translation has been widely discussed in depth e.g. in the NAT working group within the Internet Engineering Task Force. The operating principles of a NAT device are well known, and there are many implementations available on the market from multiple vendors, including several implementations in freely available source code. The typical operation of a NAT may be described so that it maps IP address and port combinations to different IP address and port combinations. The mapping will remain constant for the duration of a network connection, but may change (slowly) with time. In practice, the NAT functionality is often integrated into a firewall or a router.

FIG. 1c illustrates an exemplary practical network communication situation where a transmitting node 181 is located in a first local area network (also known as the first private network) 182, which has a port NAT 183 to connect it to a wide-area general packet-switched network 184 like the Internet. The latter consists of a very large number of nodes interconnected in an arbitrary way. A receiving node 185 is located in a second local area network 186 which is again coupled to the wide-area network through a NAT 187. The denominations "transmitting node" and "receiving node" are somewhat misleading, since the communication required to set up network security services is bidirectional. The transmitting node is the one that initiates the communication. Also the terms "Initiator" and "Responder" are used for the transmitting node and the receiving node respectively.

The purpose of FIG. 1c is to emphasize the fact that the communicating nodes are aware of neither the number or nature of the intermediate devices through which they communicate nor the nature of transformations that take place. In addition to NATs, there are other types of devices on the Internet that may legally modify packets as they are transmitted. A typical example is a protocol converter, whose main job is to convert the packet to a different protocol without disturbing normal operation. Using them leads to problems very similar to the NAT case. A fairly simple but important example is converting between IPv4 and IPv6, which are different versions of the Internet Protocol. Such converters will be extremely important and commonplace in the near future. A packet may undergo several conversions of this type during its travel, and it is possible that the endpoints of the communication actually use a different protocol. Like NAT, protocol conversion is often performed in routers and firewalls.

It is well known in the IPSEC community that the IPSEC protocol does not work well across network address translations. The problem has been discussed at least in the references given as HoldregeSrisuresh99 and Rekhter99.

In the Finnish patent application number 974665 and the corresponding PCT application number FI98/01032, which are incorporated herein by reference, we have presented a certain method for performing IPSEC address translations and a method for packet authentication that is insensitive to address transformations and protocol conversions en route of the packet. Additionally in said applications we have presented a transmitting network device and a receiving network device that are able to take advantage of the aforementioned method. However, some problems related to the provision of network security services over network address translation remain unsolved in said previous patent applications.

SUMMARY OF THE INVENTION

It is an object of the present invention to present a method and the corresponding devices for detection of occurrence of network address translations.

According to a first aspect of the invention there is therefore provided a method for securely communicating packets between a first computer device and a second computer device through a packet-switched data transmission network comprising intermediate computer devices, where at least one of said computer devices performs a network address translation and/or a protocol conversion, the method comprising the steps of determining what network address translations, if any, occur on packets transmitted between the first computer device and the second computer device, taking packets conforming to a first protocol and encapsulating them into packets conforming to a second protocol, which second protocol is capable of traversing network address translations, transmitting said packets conforming to said second protocol from the first computer device to the second computer device and decapsulating said transmitted packets conforming to said second protocol into packets conforming to said first protocol.

According to a second aspect of the invention there is provided a method for conditionally setting up a secure communication connection between a first computer device and a second computer device through a packet-switched data transmission network comprising intermediate computer devices, where at least one of said computer devices performs a network address translation and/or a protocol conversion, the method comprising the steps of finding out, whether or not the second computer device supports a communication method where: it is determined what network address translations, if any, occur on packets transmitted between the first computer device and the second computer device; packets are taken that conform to a first protocol and encapsulated into packets that conform to a second protocol, which second protocol is capable of traversing network address translations; said packets conforming to said second protocol are transmitted from the first computer device to the second computer device; and said transmitted packets conforming to said second protocol are decapsulated into packets conforming to said first protocol, as a response to a finding indicating that the second computer device supports said communication method, setting up a secure communication connection between the first computer device and the second computer device in which communication connection said communication method is employed and as a response to a finding indicating that the second computer device does not support said communication method, disabling the use of said communication method between the first and the second computer devices.

According to a third aspect of the invention there is provided a method for tunnelling packets between a first computer device and a second computer device through a packet-switched data transmission network comprising intermediate computer devices, where at least one of said computer devices performs a network address translation and/or a protocol conversion, the method comprising the steps of taking packets conforming to a first protocol and encapsulating them at the first computer device into packets conforming to a second protocol, which second protocol is capable of traversing network address translations, transmitting said packets conforming to said second protocol from the first computer device to the second computer device, decapsulating said transmitted packets conforming to said second protocol into packets conforming to said first protocol at the second computer device, generating response packets conforming to said first protocol and encapsulating them at the second computer device into response packets conforming to said second protocol, transmitting said response packets conforming to said second protocol from the second computer device to the first computer device, decapsulating said transmitted response packets conforming to said second protocol into packets conforming to said first protocol at the first computer device, using the response packets at the first computer device to obtain information about the address translations occurred on packets transmitted between the first computer device and the second computer device and using said obtained information to modify the operation of the tunnelling of packets between the first computer device and the second computer device.

According to a fourth aspect of the invention there is provided a method for tunnelling packets between a first computer device and a second computer device through a packet-switched data transmission network comprising intermediate computer devices, in which data transmission network there exists a security protocol comprising a key management connection that employs a specific packet format for key management packets, the method comprising the steps of encapsulating data packets that are not key management packets into said specific packet format for key management packets, transmitting said data packets encapsulated into the specific packet format from the first computer device to the second computer device, discriminating at the second computer device the data packets encapsulated into the specific packet format from actual key management packets and decapsulating the data packets encapsulated into the specific packet format.

According to a fifth aspect of the invention there is provided a method for securely communicating packets between a first computer device and a second computer device through a packet-switched data transmission network comprising intermediate computer devices, where at least one of said computer devices performs a network address translation and/or a protocol conversion and where a security protocol exists comprising a key management connection, the method comprising the steps of for determining what network address translations, if any, occur on packets transmitted between the first computer device and the second computer device: establishing a key management connection according to said security protocol between the first computer device and the second computer device; composing an indicator packet with a header part and a payload part of which both comprise the network addresses of the first computer device and the second computer device as seen by the node composing said packet; transmitting and receiving said indicator packet within the key management connection; and comparing in the received indicator packet the addresses contained in the header part and the payload part, and using the information concerning the determined occurrences of network address translations for securely communicating packets between the first computer device and the second computer device.

According to a sixth aspect of the invention there is provided a method for securely communicating packets between a first computer device and a second computer device through a packet-switched data transmission network comprising intermediate computer devices, where at least one of said computer devices performs a network address translation and/or a protocol conversion; where a security protocol is acknowledged which determines transport-mode processing of packets for transmission and reception; and where a high-level protocol checksum has been determined for checking the integrity of received packets, the method comprising the steps of at the first computer device, performing transport-mode processing for packets to be transmitted to the second computer device, at the second computer device, performing transport-mode processing for packets received from the first computer device, said transport-mode processing comprising the decapsulation of received packets and at the second computer device, updating the high-level protocol checksum for decapsulated packets for compensating for changes, if any, caused by network address translations.

According to a seventh aspect of the invention there is provided a method for maintaining the unchanged form of address translations performed by network address translation devices on encapsulated data transmission packets communicated between a first computer device and a second computer device through a packet-switched data transmission network, the method comprising the steps of determining which address translations occur on actual data packets transmitted with certain address information between the first computer device and the second computer device through the packet-switched data transmission network and forcing at least one of the first computer device and the second computer device to transmit to the other computer device keepalive packets with address information identical to that of actual data packets at a high enough frequency so that network address translation devices constantly reuse the mappings used for network address translation even when a certain fraction of the packets communicated between the first computer device and the second computer device are lost in the network.

DETAILED DESCRIPTION OF THE INVENTION

Figure 1A:
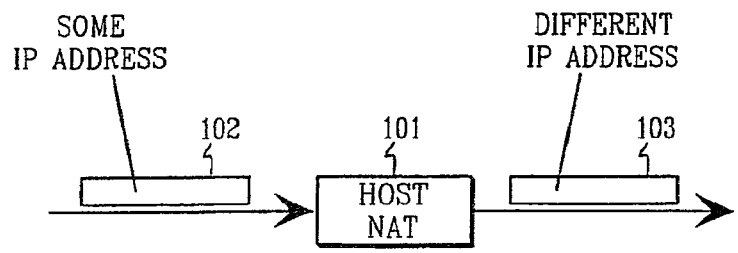
FIG. 1a illustrates the known use of a host NAT.
Figure 1B:
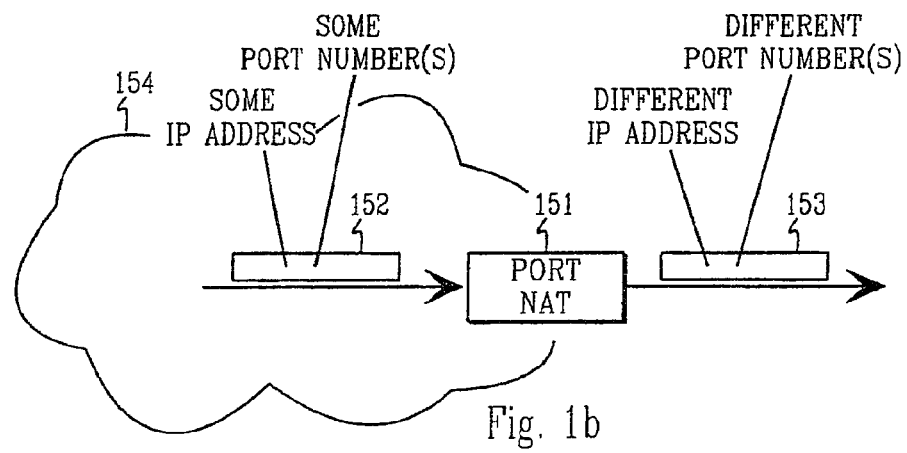
FIG. 1b illustrates the known use of a port NAT.
Figure 1C:
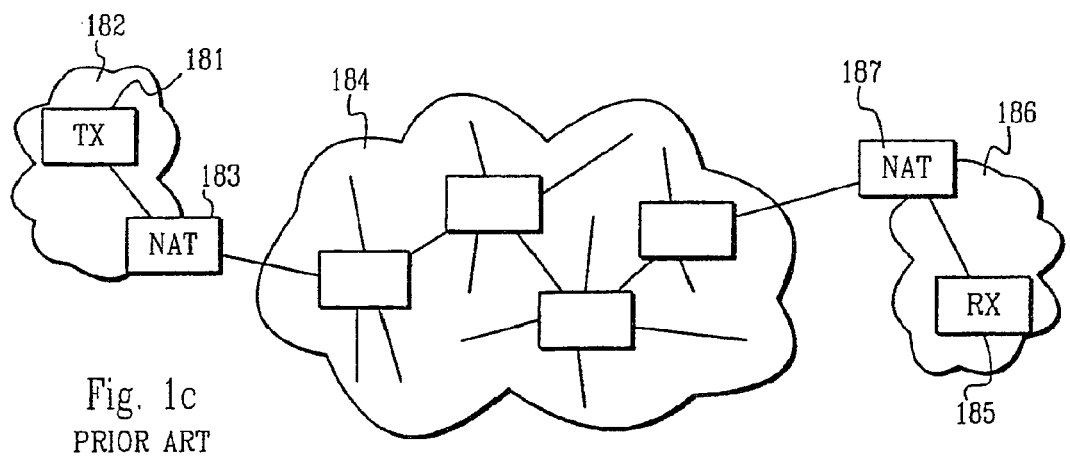
FIG. 1c illustrates a known communication connection between nodes through a packet-switched network.

The present invention combines and extends some of the methods of network address translation, tunneling over UDP, IKE, and the IKE extension mechanisms, in a novel and inventive way to produce a method for secure communications across network address translations and protocol conversions. The method can be made fully automatic and transparent to the user.

A key point relating to the applicability of the invention is that—at the priority date of the present patent application—in general only TCP (described in RFC793, which is hereby incorporated by reference) and UDP (described in RFC768, which is hereby incorporated by reference) work over NAT. This is because most NATs used in practise are port NATs, and this is the form of NAT that provides most benefits with regards to the shortage of globally routable IP addresses. The invention is not, however, limited to the use of UDP and TCP as they are known at the priority date of this patent application: in general it may be said that UDP and TCP are examples of protocols that determine that connection identification information (i.e. addressing and port numbering) that is mapped into another form in the address transformation process. We may expect that other kinds of communication protocols and address transformations emerge in the future.

The various aspects of the invention are related to
determining whether a remote host supports a certain method which is typically a secure communication method according to the invention (the "methods supported" aspect),
determining what network address translations and/or protocol conversions occur on packets, if any (the "occurring translations" aspect),
tunneling packets inside a certain carefully selected protocol, typically UDP, to make them traverse NATs (the "selected tunnelling" aspect),
using a keepalive method to make sure that involved NAT devices and other devices that use timeouts for mappings do not lose the mapping for the communicating hosts (the "keepalive" aspect),
compensating for the translations that occur before verifying the message authentication code for AH packets (the "compensation/authentication" aspect) and
performing address translations at either the sending or receiving node to compensate for multiple hosts being mapped to a single public address (the "compensation/mapping" aspect).

The process of encapsulating data packets for transmission over a different logical network is called tunneling. Typically, in the case of the IP protocol, tunneling involves adding a new IP header in front of the original packet, setting the protocol field in the new header appropriately, and sending the packet to the desired destination (endpoint of the tunnel). Tunneling may also be implemented by modifying the original packet header fields or replacing them with a different header, as long as a sufficient amount of information about the original packet is saved in the process so that it will be possible to reconstruct the packet at the end of the tunnel into a form sufficiently similar to the original packet entering the tunnel. The exact amount of information that needs to be passed with the packet depends on the network protocols, and information may be passed either explicitly (as part of the tunnelled packet) or implicitly (by the context, as determined e.g. by previously transmitted packets or a context identifier in the tunneled packet).

It is well known in the art how to tunnel packets over a network. At least the references given as RFC1226, RFC1234, RFC1241, RFC1326, RFC1701, RFC1853, RFC2003, RFC2004, RFC2107, RFC2344, RFC2401, RFC2406, RFC2473 and RFC2529 (all of which are hereby incorporated by reference) relate to the subject of tunneling. For example, RFC1234 presents a method of tunneling IPX frames over UDP. In that method, packets are tunneled to a fixed UDP port and to the decapsulator's IP address.

The IPSEC protocol mentioned in the background description typically uses the Internet Key Exchange or IKE protocol (known from references RFC2409, RFC2408 and RFC2407, all of which are hereby incorporated by reference) for authenticating the communicating parties to each other, deriving a shared secret known only to the communicating parties, negotiating authentication and encryption methods to be used for the communication, and agreeing on a security parameter index (SPI) value and a set of selectors to be used for the communication. The IKE protocol was previously known as the ISAKMP/Oakley, where the acronym ISAKMP comes from Internet Security Association Key Management Protocol. Besides said normal negotiation specified in the IKE standard, IKE supports certain mechanisms for extension. The Vendor ID payload known from reference RFC2408, which is hereby incorporated by reference, allows communicating parties to determine whether the other party supports a particular private extension mechanism. The IPSEC DOI (Domain of Interpretation) known as RFC2407, which is hereby incorporated by reference, reserves certain numeric values for such private extensions.

Figure 2A:
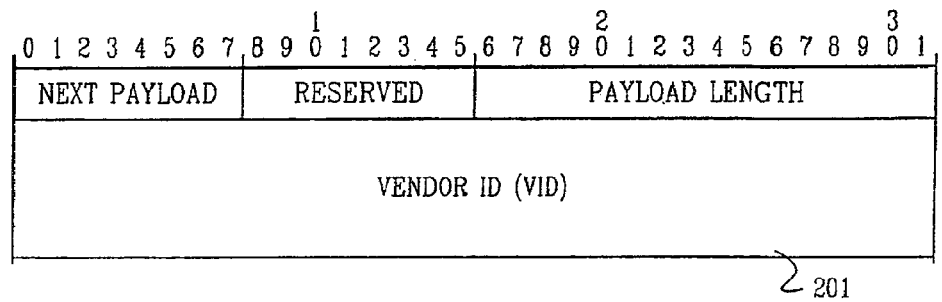
FIG. 2a illustrates a certain Vendor ID payload applicable within the context of the invention.

Currently, the well-known Vendor ID payload is defined to have the format illustrated in FIG. 2a, where the column numbers correspond to bit positions. For the purposes of the present invention the Vendor ID field 201 is the most important part of the Vendor ID payload. In the context of the IKE protocol, negotiating whether the remote host supports a certain method for providing secure network communications can be performed as follows. The terminology used here is borrowed from the IKE documents.

Figure 3:
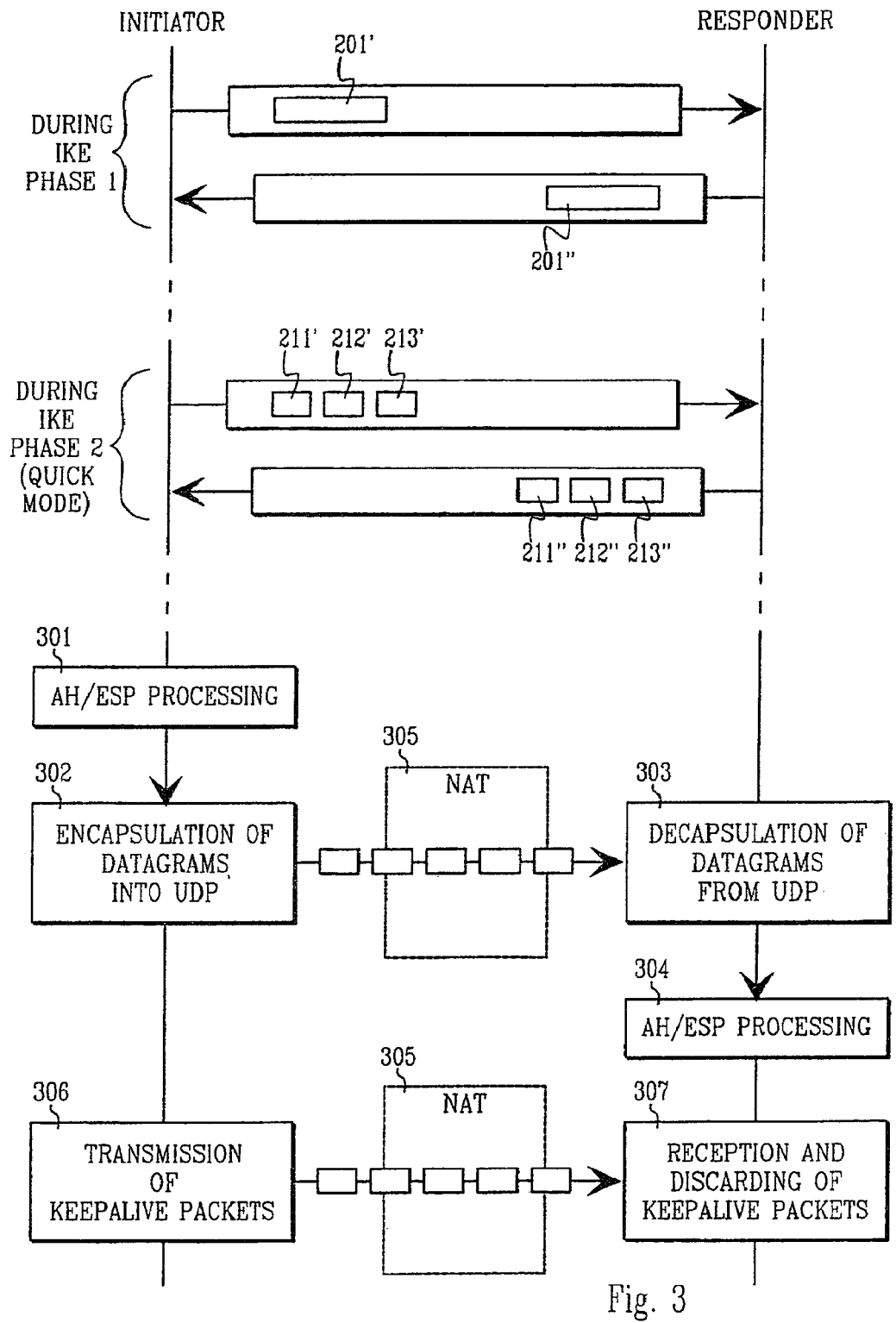
FIG. 3 illustrates certain method steps related to the application of the invention.

The IKE protocol determines the so-called Phase 1 of the mutual exchange of messages between the Initiator (i.e., the node first sending a packet to the other) and the Responder (i.e., the node first receiving a packet). FIG. 3 illustrates an exchange of first Phase 1 messages between the Initiator and the Responder. According to the "methods supported" aspect of the invention both devices include a certain Vendor ID Payload in a certain Phase 1 message which is most advantageously their first Phase 1 message. This payload indicates that they support the method in question.

In FIG. 3 the Vendor ID fields contained within the Initiator's first (or other) Phase 1 message is schematically shown as 201' and the Vendor ID fields contained within the Responder's first (or other) Phase 1 message is schematically shown as 201". To indicate support for a certain method the Vendor ID field in the Vendor ID Payload is basically an identification of that method: advantageously it is the MD5 hash of a previously known identification string, e.g. "SSH IPSEC NAT Traversal Version 1", without any trailing zeroes or newlines. Producing MD5 hashes of arbitrary character sequences is a technique well known in the art for example from the publication RFC1321, which is hereby incorporated by reference, mentioned in the list of references.

Next we will address the "occurring translations" aspect of the invention. In addition to the above-mentioned Phase 1, the IKE protocol determines the so-called Phase 2 of the mutual exchange of messages between the Initiator and the Responder. According to the "occurring translations" aspect of the invention the parties can determine which translations occur by including the IP addresses they see in private payloads of certain Phase 2 Quick Mode messages, which are most advantageously their first Phase 2 Quick Mode messages. Any unused number in the private payload number range can be used to signify such use of the private payload (e.g. 157, which is unused at the priority date of the present patent application).

Figure 2B:
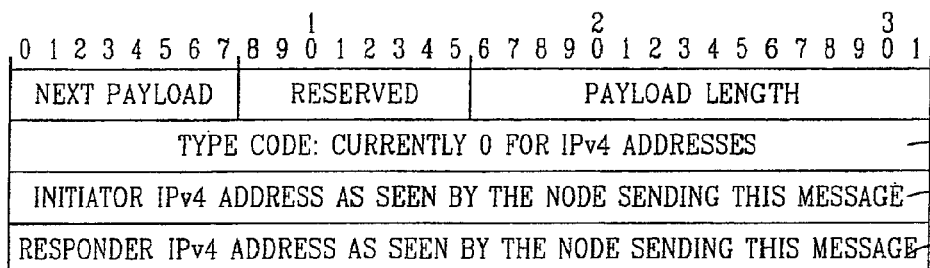
FIG. 2b illustrates a certain private payload applicable within the context of the invention.

The private payload used to reveal the occurring translations can have e.g. the format illustrated in FIG. 2b. Field 211 contains a type code that identifies the types of the addresses that appear in fields 212 and 213. Field 212 contains the address of the Initiator as seen by the node sending the message, and field 213 contains the address of the Responder as seen by the node sending the message. FIG. 3 shows the exchange of (first) Phase 2 Quick Mode messages between the Initiator and the Responder so that the corresponding fields 211', 212' and 213' are included in the message sent by the former and the fields 211", 212" and 213" are included in the message sent by the latter.

According to known practice the addresses of the Initiator and Responder are also included in the header of the packet that contains the payload of FIG. 2b. In the header they are susceptible to address translations and other processing whereas in the private payload they are not. When the packet with the payload of FIG. 2b is received, the addresses contained in it are compared with those seen in the packet header. If they differ, then an address translation occurred on the packet. Later we will refer to the use of the standard IKE port number 500 together with applying the invention; as an additional way of detecting occurred translations the port numbers of the received packet can also be compared against the standard IKE port number 500 to determine if port translations occurred.

An aspect of some importance when handling the addresses is that the UDP source port of the packet can be saved for later use. It would usually be saved with the data structures for Phase 1 ISAKMP security associations, and would be used to set up compensation processing for Phase 2 IPSEC security associations.

To use the method described above to implement the "occurred translations" aspect of the invention, the hosts must modify their Phase 2 identification payloads: the payload illustrated in FIG. 2b is not known in the existing standards. One possibility is to restrict the payloads to the ID_IPV4_ADDR and ID_IPV6_ADDR types, which would be appropriate for host-to-host operation.

Next we will address the "selected tunnelling", "compensation/authentication" and "compensation/mapping" aspects of the invention. According to this aspect of the invention the actual data packets can be tunneled over the same connection which is used to set up the security features of the communication connection, e.g. the UDP connection used for IKE. This ensures that the actual data packets will experience the same translations as the IKE packets did when the translation was determined. Taken that the standard port number 500 has been determined for IKE, this would mean that all packets are sent with source port 500 and destination port 500, and a method is needed to distinguish the real IKE packets from those containing encapsulated data. One possible way of doing this takes advantage of the fact that the IKE header used for real IKE packets contains an Initiator Cookie field: we may specify that Initiators that support this aspect of the invention never generate cookies that have all zeroes in their four first bytes. The value zero in the corresponding four bytes is then used to recognize the packet as a tunneled data packet. In this way, tunneled data packets would have four zero bytes at the beginning of the UDP payload, whereas real IKE packets never would.

Figure 4:
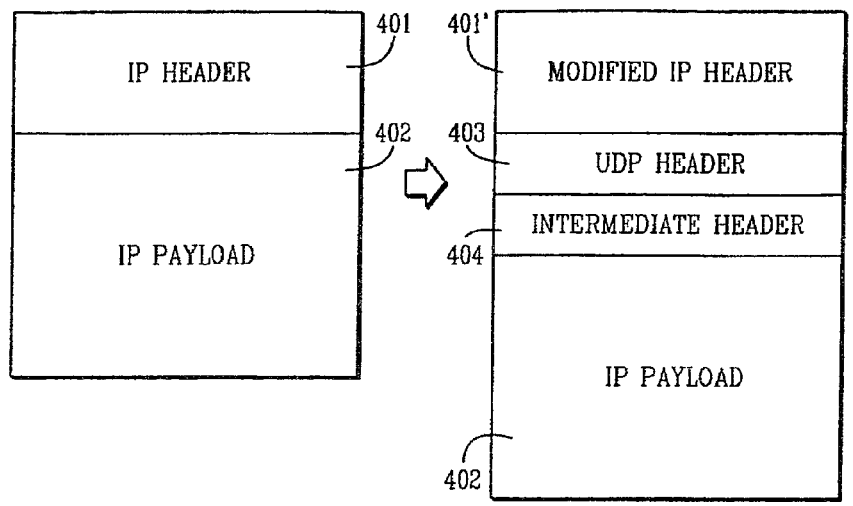
FIG. 4 illustrates a transformation of header structures according to an aspect of the invention.

FIG. 4 illustrates the encapsulation of actual IPSEC packets into UDP for transmission. Basically, a UDP header 403 and a short intermediate header 404 are inserted after the IP header 401 already in the packet (with the protocol field copied to the intermediate header). The IP header 401 is slightly modified to produce a modified IP header 401'. The IP payload 402 stays the same. The simple illustration of the unencapsulated IPSEC packet on the left should not be misinterpreted: this packet is not plaintext but has been processed according to AH or ESP or corresponding other transformation protocol in the sending node before its encapsulation into UDP.

Without limiting the generality, it is assumed in the presentation here that the encapsulation according to FIG. 4 is always performed by the same nodes that perform IPSEC processing (either an end node or a VPN device). It should also be noted that instead of encapsulating the IPSEC packets into UDP they could be encapsulated into TCP. This alternative would probably require using fake session starts and ends so that the first packet has the SYN bit and the last packet has the FIN bit, as specified in the TCP protocol.

In encapsulating an actual data packet or a "datagram" according to FIG. 4, the original IP header 401—defined in RFC791, which is hereby incorporated by reference,—is modified to produce the modified IP header 401' as follows:
  the Protocol field in the IP header (not separately shown) is replaced by protocol 17 for UDP in accordance with RFC768, which is hereby incorporated by reference,
  the Total Length field in the IP header (not separately shown) is incremented by the combined size of the UDP and intermediate headers (total 16 bytes) and
  the Header Checksum field in the IP header (not separately shown) is recomputed in accordance with the rules given in RFC791, which is hereby incorporated by reference.

Figure 2C:
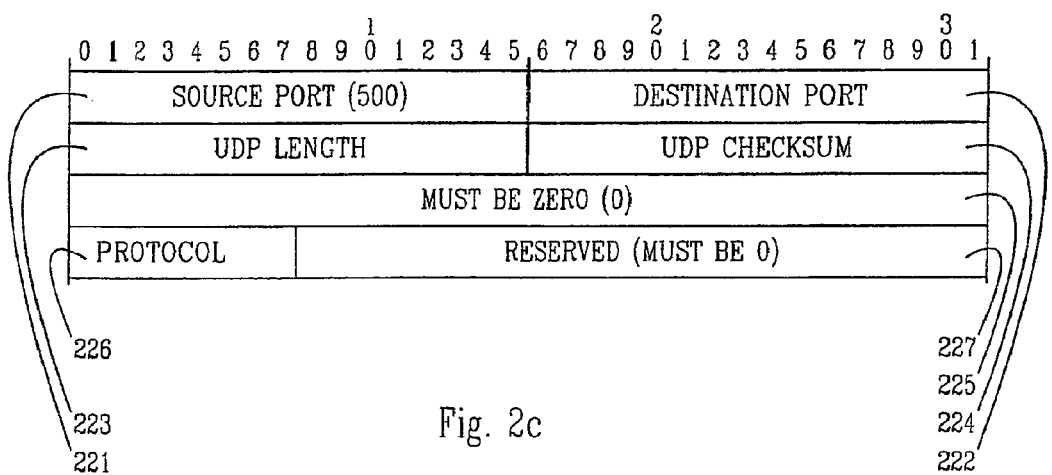
FIG. 2c illustrates a certain combined header structure applicable within the context of the invention.

As seen from FIG. 4, an UDP header 403—as defined in RFC768, which is hereby incorporated by reference,—and an intermediate header 404 are inserted after the IP header. The UDP header is 8 octets and the intermediate header is 8 octets, for a total of 16 octets. These headers are treated as one in the following discussion. The combined header has most advantageously the format illustrated in FIG. 2c. Fields of this header are set as follows:
  The Source Port field 221 is set to 500 (same as IKE). If the packet goes through NAT, this may be different when the packet is received.
  The Destination Port field 222 is set to the port number from which the other end appears to be sending packets. If the packet goes through NAT, the recipient may see a different port number here.
  The UDP Length field 223 is the length of the UDP header plus the length of the UDP data field. In this case, it also includes the intermediate header. The value is computed in bytes as 16 plus the length of the original IP packet payload (not including the original IP header, which is included in the Length field in the IP header).
  The UDP Checksum field 224 is most advantageously set to 0. The UDP checksum is optional, and we do not wish to calculate or check it with this tunneling mechanism. Integrity of the data is assumed to be protected by an AH or ESP header within the tunneled packet.
  The Must be zero field 225: This field must contain a previously agreed fixed value, which is most advantageously all zeroes. The field overlaps with the first four bytes of the Initiator Cookie field in an actual IKE header. Any Initiator that supports this aspect of the invention must not use a cookie where the first four bytes are zero. These zero bytes are used to separate the tunneled packets from real ISAKMP packets. Naturally some other fixed value than "all zeroes" could be chosen, but the value must be fixed for this particular use.
  Protocol field 226: The value of this field is copied from the known Protocol field in the original IP header (not separately shown in FIG. 4).
  Reserved field 227: most advantageously sent as all zeroes; ignored on reception.

The sender inserts this header in any packets tunneled to a destination behind NAT. Information about whether NAT is used can be stored on a per SA (Security Association) basis in the policy manager. The encapsulation referred to in FIG. 4 can be implemented either as a new transform or as part of the otherwise known AH and ESP transforms.

The encapsulation operation makes use of the UDP port number and IP address of the remote host, which were determined during the IKE negotiation.

The receiver decapsulates packets from this encapsulation before doing AH or ESP processing. Decapsulation removes this header and updates the Protocol, Length, and Checksum fields of the IP header. No configuration data (port number etc.) is needed for this operation.

The decapsulation should be performed only if all of the following selectors match:
  destination address is the destination address of this host,
  source address is the address of a host with which this host has agreed to use this tunnelling,
  the Protocol field indicates UDP,
  the Destination port field value is 500 and
  the Source port field value indicates the port with which this host has agreed to use this tunneling. (Note that there may be multiple source addresses and ports for which this tunneling is performed; each of them is treated by a separate set of selectors.)

During decapsulation the source address in the received packet can be replaced by the real source address received during the IKE negotiation. This implements the compensation for AH MAC verification. The address is again changed in the post-processing phase below. Because of this compensation, the standard AH and ESP transforms can be used unmodified.

In FIG. 3 the AH/ESP processing at the sending node is schematically shown as block 301, encapsulation of datagrams into UDP is schematically shown as block 302, the corresponding decapsulation of datagrams from UDP is schematically shown as block 303 and AH/ESP processing at the receiving node is schematically shown as block 304.

Additional compensation must be done after the packet has been decapsulated from AH or ESP. This additional decapsulation must deal with the fact that the outer packet actually went through NAT (illustrated schematically in FIG. 3 as block 305), and consequently the plaintext packet must also undergo a similar transformation. The recipient must see the address of the NAT device as the address of the host, rather than the original internal address. Alternatively, this compensation could have been performed by the sender of the packet before encapsulating it within AH or ESP.

There are several alternatives for this additional compensation for various special cases (the best compensation depends on the particular application):

Allocating a range of network addresses for this processing (say, in the link-local use range 169.254.x.x—the actual values do not matter; basically we just want an arbitrary network that no-one else is using). An address in this range is allocated for each <natip, ownip, natport, ownport> combination, where natip means the IP address of the NAT, ownip means the processing device's own IP address, natport means the port number at the NAT and own port means the processing device's own port number. The remote address in the packet is replked by this address before the packet is sent to protocol stacks.

As part of the compensation, the TCP checksum for internal hosts must be recomputed if host addresses or port numbers changed. TCP checksum computations may also be incremental, as is known from RFC1071, which is hereby incorporated by reference. Port NAT may need to be performed for the source port.

When used as a VPN between two sites using incompatible (possibly overlapping) private address spaces, address translation must be performed to make the addresses compatible with local addresses.

When used as a VPN between two sites using compatible (non-overlapping) private address spaces, and tunnel mode is used, no additional compensation may be needed.

Address translation may need to be performed for the contents of certain protocol packets, such as FTP (known from RFC959, which is hereby incorporated by reference) or H.323. Other similar issues are discussed in the reference given as HoldregeSrisuresh99.

It may also be possible to use random addresses for the client at the server, and perform address translation to this address. This could allow the server to distinguish between multiple clients behind the same NAT, and could avoid manual configuration of the local address space.

The compensation operation may or may not interact with the TCP/IP stack on the local machine to reserve UDP port numbers.

In general, this invention does not significantly constrain the method used to compensate for inner packets the NAT occurring for the outer header. The optimal method for performing such compensation may be found among the above-given alternatives by experimenting, or some other optimal method could be presented.

Next we will address the "keepalive" aspect of the invention, i.e. ensuring that the network address translations performed in the network do not change after the translations that occur have been determined. Network address translators cache the information about address mapping, so that they can reverse the mapping for reply packets. If TCP is used, the address translator may look at the FIN bit of the TCP header to determine when it can drop a particular mapping. For UDP, however, there is no explicit termination indication for flows. For this reason, many NATs will time out mappings for UDP quite fast (even as fast as in 30 seconds). Thus, it becomes necessary to force the mapping to be maintained.

A possible way of ensuring the maintaining of mappings is to send keepalive packets frequently enough that the address translation remains in the cache. When computing the required frequency, one must take into account that packets may be lost in the network, and thus multiple keepalives must be sent within the estimated shortest period in which NATs may forget the mapping. The appropriate frequency depends on both the period the mappings are kept cached and on the packet loss probability of the network; optimal frequency values for various context may be found through experimenting.

Keepalive packets do not need to contain any meaningful information other than the necessary headers that are equal to the data packet headers to ensure that the keepalive packets will be handled exactly in the same way as the actual data packets. A keepalive packet may contain an indicator that identifies it as a keepalive packet and not a data packet; however it may also be determined that all packets that do not contain meaningful payload information are interpreted to be keepalive packets. In FIG. 3 the transmission of keepalive packets is schematically illustrated by block 306 and the reception and discarding of them is schematically illustrated by block 307. It should be noted that the use of keepalive packets is not needed at all if actual data packets are transmitted frequently enough and/or the connection is to remain valid only for such a short time (e.g. a few seconds) that it is improbable that any intermediate device would delete the mapping information from its cache. Keepalive packets need to be transmitted in one direction only, although they may be transmitted also bidirectionally; the drawback resulting from their bidirectional transmission is the resulting increase in unnecessary network traffic. The invention does not limit the direction(s) in which keepalive packets (if any) are transmitted.

Figure 5:
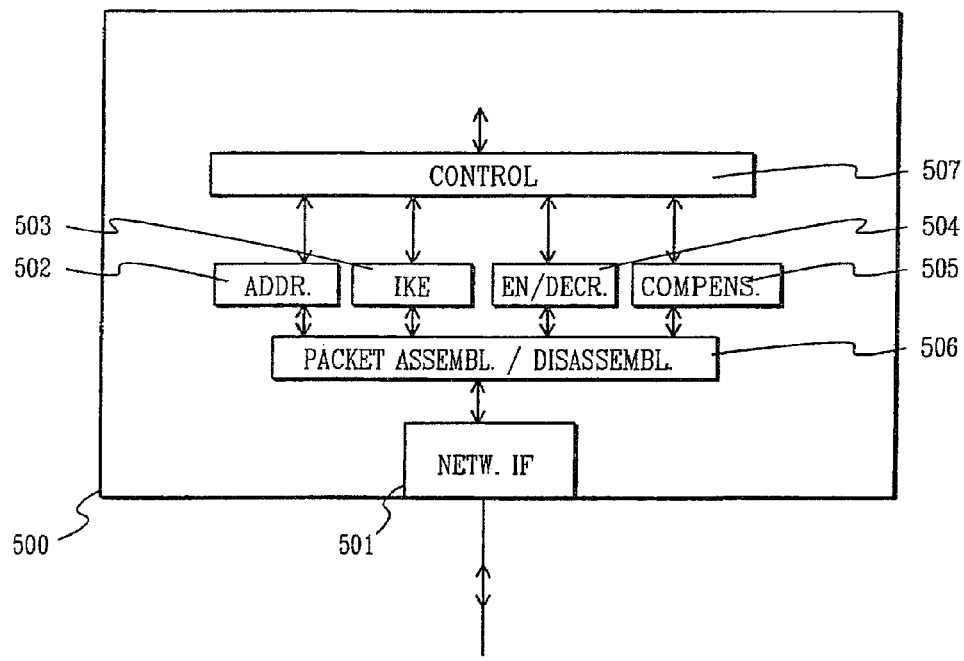
FIG. 5 illustrates a simplified block diagram of a network device used to implement the method according to the invention.

FIG. 5 is a simplified block diagram of a network device 500 that can act as the Initiator or the Responder according to the method of providing secure communications over network address translations in accordance with the invention. Network interface 501 connects the network device 500 physically to the network. Address management block 502 keeps track of the correct network addresses, port numbers and other essential public identification information of both the network device 500 itself and its peer (not shown). IKE block 503 is responsible for the key management process and other activities related to the exchange of secret information. Encryption/decryption block 504 implements the encryption and decryption of data once the secret key has been obtained by the IKE block 503. Compensation block 505 is used to compensate for the permissible transformations in the transmitted and/or received packets according to the invention. Either one of blocks 504 and 505 may be used to transmit, receive and discard keepalive packets. Packet assembler/disassembler block 506 is the intermediator between blocks 502 to 505 and the physical network interface 501. All blocks operate under the supervision of a control block 507 which also takes care of the routing of information between the other blocks and the rest of the network device, for example for displaying information to the user through a display unit (not shown) and obtaining commands from the user through a keyboard (not shown). The blocks of FIG. 5 are most advantageously implemented as pre-programmed operational procedures of a microprocessor, which implementation is known as such to the person skilled in the art. Other arrangements than that shown in FIG. 5 may as well be used to reduce the invention into practice.

Even though the present invention was presented in the context of IKE, and tunneling using the IKE port, it should be understood that the invention applies to also other analogous cases using different packet formatting methods, different negotiation details, a different key exchange protocol, or a different security protocol. The invention may also be applicable to non-IP protocols with suitable characteristics. The invention is equally applicable to both IPv4 and IPv6 protocols. The invention is also intended to apply to future revisions of the IPSEC and IKE protocols.

It should also be understood that the invention can also be applied to protocol translations in addition to just address translations. Adapting the present invention to protocol translations should be well within the capabilities of a person skilled in the art given the description here and the discussions regarding protocol translation in the former patent applications of the same applicant mentioned above and incorporated herein by reference.

LIST OF REFERENCES

All of the following references are hereby incorporated by reference.

BorellaLo99
M. Borella, J. Lo: Realm Specific IP: Protocol Specification, draft-ietf-nat-rsip-protocol-00.txt, Work in Progress, Internet Engineering Task Force, 1999.

HoldregeSrisuresh99
M. Holdrege, P. Srisuresh: Protocol Complications with the IP Network Address Translator (NAT), draft-ietf-nat-protocol-complications-00.txt, Work in Progress, Internet Engineering Task Force, 1999.

LoBorella99
J. Lo, M. Borella: Real Specific IP: A Framework, draft-ietf-nat-rsip-framework-00.txt, Work in Progress, Internet Engineering Task Force, 1999.

Rekhter99
Y. Rekhter: Implications of NATs on the TCP/IP architecture, draft-ietf-nat-arch-implications-00.txt, Internet Engineering Task Force, 1999.

RFC768
J. Postel: User Datagram Protocol, RFC 768, Internet Engineering Task Force, 1980.

RFC791
J. Postel: Internet Protocol, RFC 791, Internet Engineering Task Force, 1981.

RFC793
J. Postel: Transmission Control Protocol, RFC 793, Internet Engineering Task Force, 1981.

RFC959
J. Postel, J. Reynolds: File Transfer Protocol, RFC 959, Internet Engineering Task Force, 1985.

RFC1071
R. Braden, D. Borman, C. Partridge: Computing the Internet checksum, RFC 1071, Internet Engineering Task Force, 1988.

RFC1226
B. Kantor: Internet protocol encapsulation of AX.25 frames, RFC 1226, Internet Engineering Task Force, 1991.

RFC1234
D. Provan: Tunneling IPX traffic through IP networks, RFC 1234, Internet Engineering Task Force, 1991.

RFC1241
R. Woodburn, D. Mills: Scheme for an internet encapsulation protocol: Version 1, RFC 1241, Internet Engineering Task Force, 1991.

RFC1321
R. Rivest: The MD5 message-digest algorithm, RFC 1321, Internet Engineering Task Force, 1992.

RFC1326
P. Tsuchiya: Mutual Encapsulation Considered Dangerous, RFC 1326, Internet Engineering Task Force, 1992.

RFC1631
K. Egevang, P. Francis: The IP Network Address Translator (NAT), RFC 1631, Internet Engineering Task Force, 1994.

RFC1701
S. Hanks, T. Li, D. Farinacci, P. Traina: Generic Routing Encapsulation, RFC 1701, Internet Engineering Task Force, 1994.

RFC1702
S. Hanks, T. Li, D. Farinacci, P. Traina: Generic Routing Encapsulation over IPv4 networks, RFC 1702, Internet Engineering Task Force, 1994.

RFC1853
W. Simpson: IP in IP Tunneling, RFC 1853, Internet Engineering Task Force, 1995.

RFC2003
C. Perkins: IP Encapsulation within IP, RFC 2003, Internet Engineering Task Force, 1996.

RFC2004
C. Perkins: IP Encapsulation within IP, RFC 2004, Internet Engineering Task Force, 1996.

RFC2107
K. Hamzeh: Ascend Tunnel Management Protocol, RFC 2107, Internet Engineering Task Force, 1997.

RFC2344
G. Montenegro: Reverse Tunneling for Mobile IP, FC 2344, Internet Engineering Task Force, 1998.

RFC2391
P. Srisuresh, D. Gan: Load Sharing using IP Network Address Translation (LSNAT), RFC 2391, Internet Engineering Task Force, 1998.

RFC2401
S. Kent, R. Atkinson: Security Architecture for the Internet Protocol, RFC 2401, Internet Engineering Task Force, 1998.

RFC2402
S. Kent, R. Atkinson: IP Authentication Header, RFC 2402, Internet Engineering Task Force, 1998.

RFC2406
S. Kent, R. Atkinson: IP Encapsulating Security Payload, RFC 2406, Internet Engineering Task Force, 1998.

RFC2407
D. Piper: The Internet IP Security Domain of Interpretation for ISAKMP. RFC 2407, Internet Engineering Task Force, 1998.

RFC2408
D. Maughan, M. Schertler, M. Schneider, J. Turner: Internet Security Association and Key Management Protocol (ISAKMP), RFC 2408, Internet Engineering Task Force, 1998.

RFC2409
D. Hakins, D. Carrel: The Internet Key Exchange (IKE), RFC 2409, Internet Engineering Task Force, 1998.

RFC2473
A. Conta, S. Deering: Generic Packet Tunneling in IPv6 Specification, RFC 2473, Internet Engineering Task Force, 1998.

RFC2529
B. Carpenter, C. Jung: Transmission of IPv6 over IPv4 Domains without Explicit Tunnels, RFC 2529, Internet Engineering Task Force, 1999.

Srisuresh98Terminology
P. Srisuresh: IP Network Address Translator (NAT) Terminology and Considerations, draft-ietf-nat-terminology-01.txt, Work in Progress, Internet Engineering Task Force, 1998.

Srisuresh98Security
P. Srisuresh: Security Model for Network Address Translator (NAT) Domains, draft-ietf-nat-security-01.txt, Work in Progress, Internet Engineering Task Force, 1998.

SrisureshEgevang98
P. Srisuresh, K. Egevang: Traditional IP Network Address Translator (Traditional NAT), draft-ietf-nat-traditional-01.txt, Work in Progress, Internet Engineering Task Force, 1998.

TYS99
W. Teo, S. Yeow, R. Singh: IP Relocation through twice Network Address Translators (RAT), draft-ietf-nat-rnat-00.txt, Work in Progress, Internet Engineering Task Force, 1999.

The invention claimed is:

1. An apparatus comprising at least one processor, and at least one memory including computer program code, the at least one memory and the computer program code being configured to, with the at least one processor, cause the apparatus to:
receive a packet comprising an encoding of a source port number; and
determine whether a network address translation occurred on the packet by comparing the source port number against a predetermined port number.

2. The apparatus of claim 1, wherein the apparatus is configured to determine an occurred network address translation when the comparing indicates that the source port number is different from the predefined source port number.

3. The apparatus of claim 1, wherein the apparatus is configured to compare a source port number in a header of the packet against a standard source port number.

4. The apparatus of claim 1, wherein the predetermined source port number comprises a standard Internet Key Exchange (IKE) port number.

5. The apparatus of claim 1, wherein the predetermined source port number is 500.

6. A method comprising:
receiving, by a computer device, a packet comprising an encoding of a source port number; and
determining whether a network address translation occurred on the packet by comparing the source port number against a predetermined port number.

7. The method of claim 6, wherein the determining comprises determining an occurred network address translation when the comparing indicates that the source port number is different from the predefined source port number.

8. The method of claim 6, wherein the determining comprises comparing a source port number in a header of the packet against a standard source port number.

9. The method of claim 6, wherein the predetermined source port number comprises a standard Internet Key Exchange (IKE) port number.

10. The method of claim 6, wherein the predetermined source port number is 500.

11. A non-transitory computer readable media for revealing occurrence of network address translations, comprising program code for causing a processor to perform instructions for
receiving a packet comprising an encoding of a source port number; and
determining whether a network address translation occurred on the packet by comparing the source port number against a predetermined port number.

12. The non-transitory computer readable media of claim 11, wherein the determining comprises determining an occurred network address translation when the comparing indicates that the source port number is different from the predefined source port number.

13. The non-transitory computer readable media of claim 11, wherein the determining comprises comparing a source port number in a header of the packet against a standard source port number.

14. The non-transitory computer readable media of claim 11, wherein the predetermined source port number comprises a standard Internet Key Exchange (IKE) port number.

15. The non-transitory computer readable media of claim 11, wherein the predetermined source port number is 500.

* * * * *